(12) United States Patent  
Bi

(10) Patent No.: US 9,542,039 B2
(45) Date of Patent: Jan. 10, 2017

(54) DISPLAY SCREEN DEVICE WITH COMMON ELECTRODE LINE VOLTAGE EQUALIZATION

(75) Inventor: Yafei Bi, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 511 days.

(21) Appl. No.: 13/601,465

(22) Filed: Aug. 31, 2012

(65) Prior Publication Data
US 2014/0062935 A1    Mar. 6, 2014

(51) Int. Cl.
*G06F 3/041* (2006.01)
*G06F 3/044* (2006.01)

(52) U.S. Cl.
CPC ........... *G06F 3/0418* (2013.01); *G06F 3/044* (2013.01)

(58) Field of Classification Search
CPC .............. G09G 2310/0243; G09G 2310/0245; G09G 2310/0248; G09G 2310/0251; G09G 2310/0254; G09G 2310/0256; G09G 2310/0259; G09G 2320/02; G09G 2320/0247; G09G 2320/0257
USPC ................................................. 345/173, 174
See application file for complete search history.

(56) References Cited

U.S. PATENT DOCUMENTS

| 6,304,241 B1 | 10/2001 | Udo et al. |
|---|---|---|
| 7,800,601 B2 | 9/2010 | Miura |
| 8,009,134 B2 | 8/2011 | Mamba et al. |
| 8,098,222 B2 | 1/2012 | Tu et al. |
| 2003/0043127 A1* | 3/2003 | Satoh et al. .................. 345/204 |
| 2007/0273633 A1 | 11/2007 | Hashimoto et al. |
| 2008/0030454 A1* | 2/2008 | Lu ........................ G09G 3/3406 345/102 |
| 2008/0158126 A1* | 7/2008 | Tung et al. .................... 345/92 |
| 2008/0238853 A1* | 10/2008 | Tu ........................ G09G 3/3655 345/98 |
| 2010/0328259 A1* | 12/2010 | Ishizaki .................. G06F 3/044 345/174 |
| 2011/0310135 A1* | 12/2011 | Feng .................... G09G 3/3648 345/690 |
| 2013/0082681 A1* | 4/2013 | Chien ...................... G09G 3/00 324/72 |

OTHER PUBLICATIONS

Cristaldi, David J., et al., *Liquid Crystal Display Drivers: Techniques and Circuits*, Springer Science+Business Media B.V. 2009, Softcover reprint of hardcover 1st Edition 2009, ISBN 978-90-481 8482-8, Table of Contents, pp. vii-x; Forward xi; and pp. 145-183.
"MOSFET", Depletion and Enhancement Mode MOSFET Applications, Feb. 6, 2015, Internet Document at: http://www.electronicshub.org/mosfet/#DepletionType—Admitted Prior Art, (17 pages).

* cited by examiner

*Primary Examiner* — Temesghen Ghebretinsae
*Assistant Examiner* — Lisa Landis
(74) *Attorney, Agent, or Firm* — Blakely, Sokoloff, Taylor & Zafman LLP

(57) ABSTRACT

A display screen has pixels, gate lines, data lines, and a number of common electrode lines. Each of the common electrode lines is coupled to a respective group of the pixels. Switch circuits are coupled to the common electrode lines. A control circuit controls the switch circuits so as to equalize the voltages of the common electrode lines to a known voltage when the display screen is turned off. Other embodiments are also described and claimed.

10 Claims, 4 Drawing Sheets

DISPLAY SCREEN DEVICE WITH COMMON ELECTRODE LINE VOLTAGE EQUALIZATION

FIELD

Embodiments of the invention relate to display screen technologies. More particularly, an embodiment of the invention relates to achieving voltage equalization of display screen common electrode lines, using display driver integrated circuitry. Other embodiments are also described.

BACKGROUND

In some display screen technologies, such as liquid crystal display (LCD), a pixel array is overlaid with a common electrode plane, e.g., a Vcom plane, which consists of a number of conductive lines, each of which run horizontally next to a row of adjacent pixels. The pixels of a row are electrically connected to an adjacent Vcom line. The Vcom line is driven by a pixel compensation circuit, which is designed to control the voltage on the Vcom line in such a manner that helps compensate for a so-called pixel kickback voltage, during row-by-row scanning of the pixel array for purposes of displaying an image. This may help reduce flicker on the display screen.

In certain touch sensing display screen (touchscreen) technologies, the Vcom line is dual-purposed; during a display interval, the Vcom line is driven by a pixel compensation (to improve the accuracy of the display screen function), while during a blanking interval (also referred to as a touch interval), the Vcom line is driven by touch sensing circuit, e.g., a capacitive touch stimulus or detection circuit. The display and touch intervals repeat at a suitable refresh rate, while the display screen is active, i.e., turned on.

SUMMARY

It has been discovered that even when a touch screen is made inactive, i.e., is turned off, there is a possibility that the common electrode plane may retain a non-zero voltage on its Vcom lines. In particular, substantially different "residual" voltages have been observed on several Vcom lines, while the touch screen is turned off. It may be that such residual Vcom line voltages adversely affect the accuracy of the display function, when the touch screen is powered up, in that they may be the cause of some cloudy patches (or muras) appearing on the touch screen when it is turned on.

An embodiment of the invention is an electronic circuit that may be used to ameliorate the cloudy patches or muras that may appear on certain display screens. A display screen has a pixel array, a number of gate lines (each being coupled to a respective row of the pixels), and a number of data lines (each being coupled to a respective column of the pixels). The display screen also has a number of common electrode lines formed therein, each being coupled to a respective group of the pixels (e.g., for purposes of pixel compensation). An electronic circuit is provided, which has a number of switch circuits, where each switch circuit has a conducting mode and an essentially non-conducting mode. Each switch circuit has (a) a control input, (b) a first carrier electrode, and (c) a second carrier electrode. The first carrier electrode of each switch circuit is coupled to a respective one of the common electrode lines. The second carrier electrode of each switch circuit is coupled to a known voltage node. A control circuit is coupled to the control inputs of the switch circuits. The control circuit is to control the switch circuits so as to equalize the voltages of the common electrode lines to a known voltage, while the display screen is turned off.

A pixel compensation circuit may be provided that is coupled to the common electrode lines, to adjust the voltage on the common electrode lines to thereby achieve flicker adjustment or otherwise correct pixel values, during a display interval.

A touch sensing circuit may be provided that is also coupled to drive the common electrode lines, e.g., a capacitive touch stimulus circuit or a capacitive touch detection circuit, during a blanking interval.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
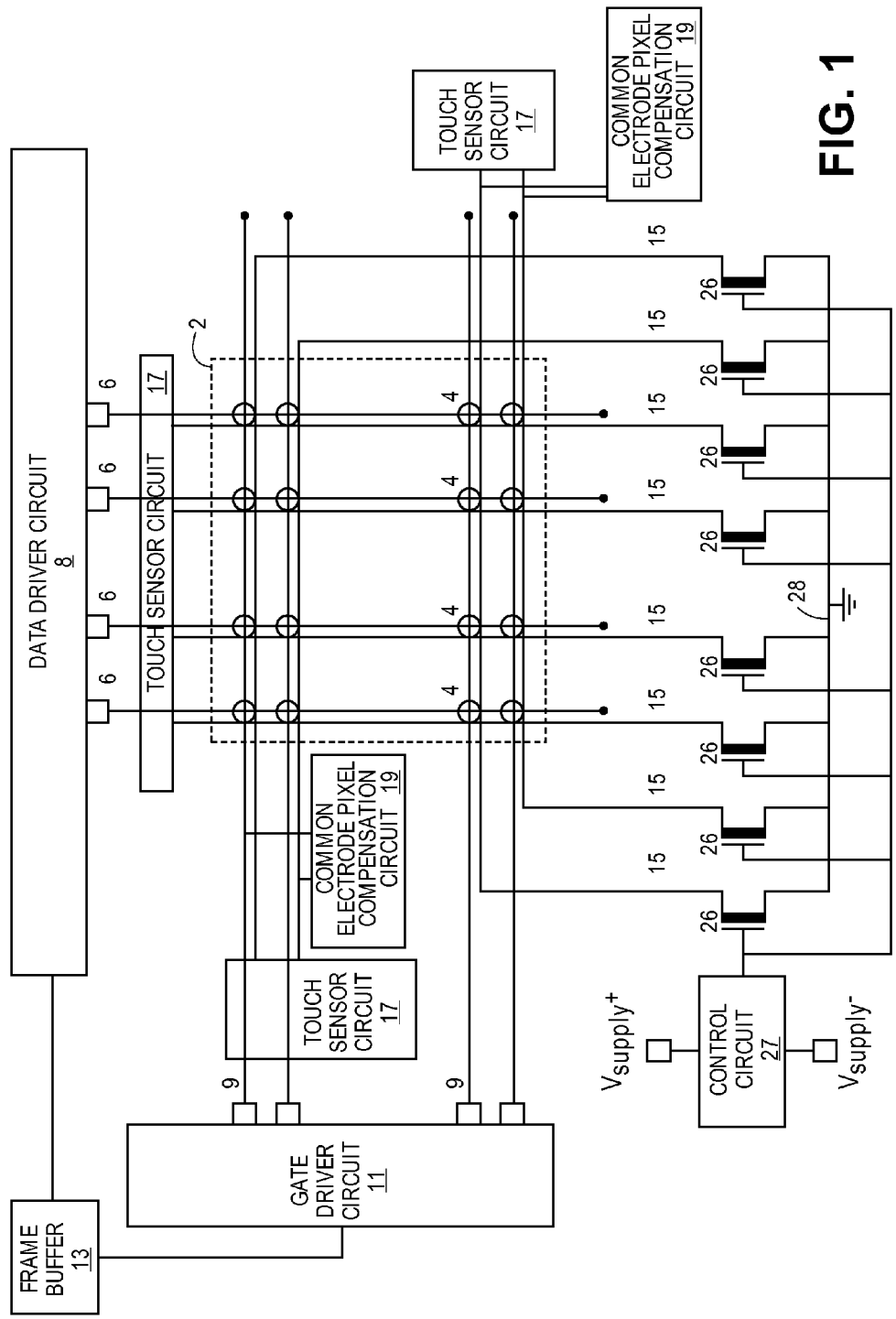
FIG. 1 is a block diagram of a display screen and switch circuits that drive a Vcom plane of the display screen.

FIG. 1 is a block diagram of relevant parts of a display screen apparatus according to an embodiment of the invention. The display screen apparatus may be part of a personal consumer electronic system, such as a digital music player, a smartphone, a tablet computer, a laptop or desktop computer, a television, or an in-vehicle information system. The display area 2 of the apparatus contains, in this depiction, sixteen pixels 4, arranged in a four by four grid. Of course, the display area 701 may alternatively have lower or higher pixel resolution. Tablet computer devices, for example, may have display screens with display area resolutions of 2048 pixels by 1536 pixels, or greater. Each pixel in a given column is coupled to a respective data line 6, which is depicted as running vertically across the screen. The data lines 6 are further coupled to a data driver circuit 8. The data driver circuit may provide each data line with color values, brightness values, or other form of image content values to be applied to the pixels in the associated column.

Each pixel in a given row is coupled to a respective gate line 9, which is depicted as running horizontally across the screen. The gate lines 9 are further coupled to a gate driver circuit 11. The gate driver circuit may rapidly cycle through the activation of each of the gate lines sequentially in short intervals, wherein activation of a gate line during a given interval allows the pixels coupled to that gate line to access the data provided by the data lines 6 during that interval. The entire screen may thus be "written" with a video image in a single frame, where the frame may have a display interval and a non-overlapping blanking interval. The display screen may also be refreshed several times per second as needed, with the same image.

Both the data driver circuit 8 and the gate driver circuit 11 are depicted in FIG. 1 as being connected to a frame buffer 13. The frame buffer 13 functions as storage for the video images that are to be written to the display screen (by the data driver circuit 8 and the gate driver circuit 11), for display by the pixels 4 within the active display area 2. These video images may be produced or routed to the frame buffer by a programmed processor, such as an applications processor, a system-on-a-chip processor, or a graphics processing unit, of a smartphone, a tablet computer or other system in which the display screen apparatus is integrated (not shown).

Each pixel 4 may be coupled to a common electrode line 15 (also referred to as a common voltage line or Vcom line). These common electrode lines may be horizontally arranged, or they may be vertically arranged. In one embodiment, there are only horizontally arranged common electrode lines, but in others there may be both. The common electrode line 15 serves to conduct an electrical current that adjusts the voltages of the common electrodes in the pixels that are coupled to it. For example, the pixel compensation circuit uses the lines 15 to compensate for unwanted variations in the pixel voltages of the coupled pixels. The common electrode lines may however also conduct an electrical current that is used by a touch sensor circuit 17. For example, when the display screen apparatus is also a touch screen, the lines 15 may be used by the touch sensor circuit, during the blanking interval of each frame to sense touch events, and by a pixel compensation circuit 19 during the display interval of each frame to write a video image for display.

Figure 2:
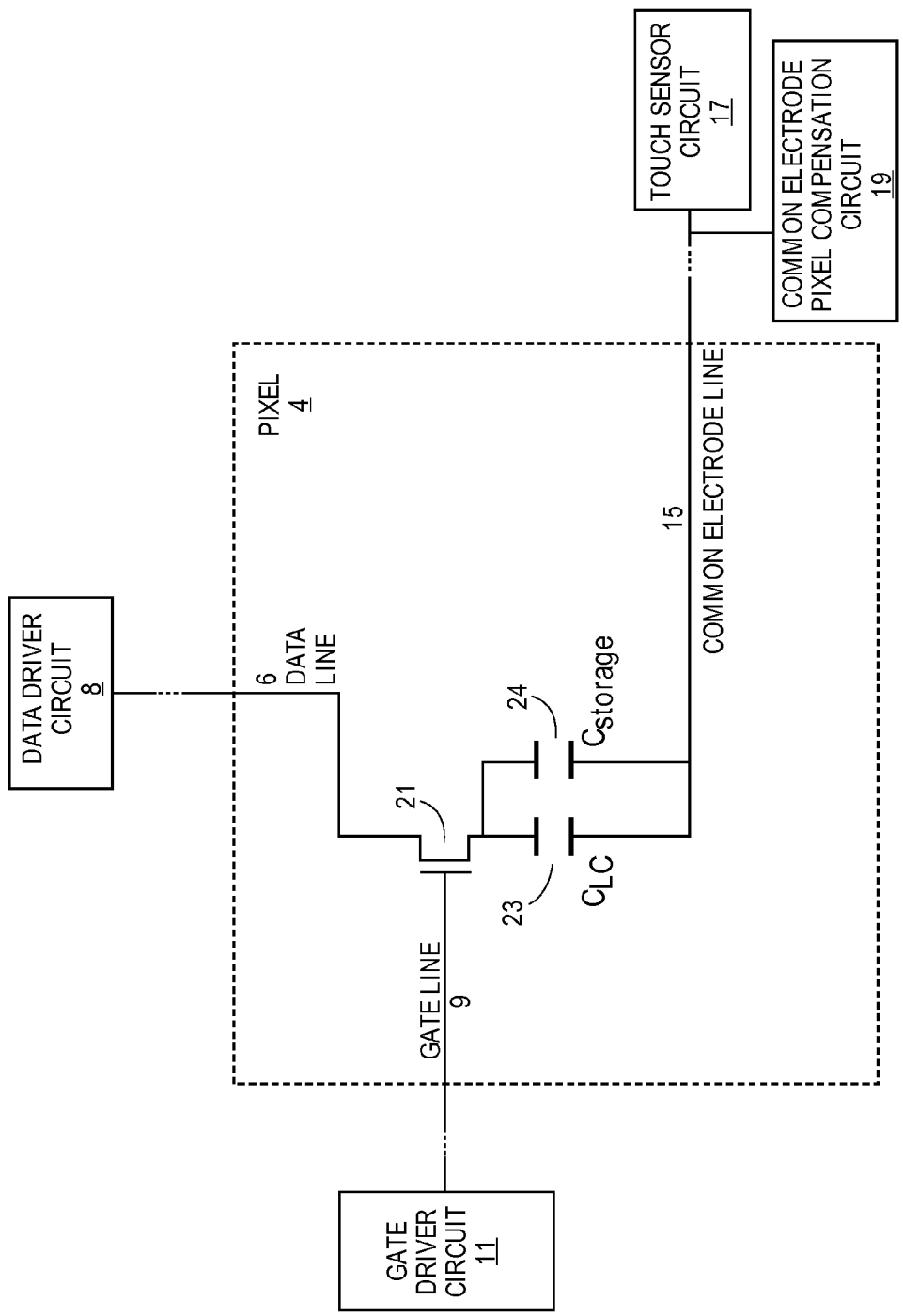
FIG. 2 depicts the internal structure of an example pixel of the display screen, and its connections to a Vcom line.

FIG. 2 is a depiction of an example pixel 4. The pixel may be an active matrix liquid crystal display (AMLCD) pixel that contains a pixel transistor 21, which has a control input, a first carrier electrode, and a second carrier electrode. The pixel transistor may be a thin film transistor (TFT). A data line 6 couples the pixel to the data driver circuit 8, via a first carrier electrode of the pixel transistor. The gate line 9 couples the pixel to the gate driver circuit 11, via the control input of the pixel transistor 21. The second carrier electrode of the pixel transistor is coupled in series with a liquid crystal capacitor 23, followed by the common electrode line 15. Further, a storage capacitor 24 may be included in parallel with the liquid crystal capacitor 23. The common electrode line 15 is shown as extending to a touch sensor circuit 15, and to a common electrode line pixel compensation circuit 19. In another embodiment, the common electrode line may extend vertically rather than horizontally.

Returning to FIG. 1, each common electrode line 15 is further coupled to a switch circuit 26. The switch circuit 26 may include one or more depletion mode field effect transistors. These may be n-channel or p-channel MOSFETs, or they may be thin film transistors ("TFTs"). Each switch circuit includes (a) a control input, (b) a first carrier electrode, and (c) a second carrier electrode. The control input may the gate electrode of a depletion mode FET. The first carrier electrode of each switch circuit is coupled to one of the common electrode lines 15. The second carrier electrode of each switch circuit may be directly connected to (or shares) a known voltage source node 28. In the example of FIG. 1, this node 28 is a ground node (zero volts), but it may alternatively be another known voltage source node that exhibits a fixed known voltage to which the common electrode lines 15 may be held while the display screen is powered off.

The switch circuit 26 may have a low-impedance conducting mode in which a low impedance path connects its first and second carrier electrodes (also referred to here as a switch closed state); it may also have a high-impedance or essentially non-conducting mode in which a high impedance path connects its first and second carrier electrodes (also referred to as a switch open state). The control input may be used to switch between these modes, based on which type of transistor is used within the switch circuit 401. For example, in the case of a single n-channel depletion mode field effect transistor such as shown in FIG. 1, the switch circuit 26 is switched into conducting mode as the control input approaches 0 volts or ground, because the second carrier electrode is tied to ground 28. The switch circuit 28 is switched into non-conducting mode as the control input approaches a negative threshold voltage. Alternatively, in the case of a p-channel depletion mode field effect transistor, the switch circuit 26 is switched into non-conducting mode as the control input approaches a positive threshold voltage.

The control input of each switch circuit 26 is coupled to a control circuit 27. The control circuit may detect, via its input, when a display screen is to transition into a powered off or powered down state by either (a) receiving a digital control signal that indicates that the display screen is or will shortly be in the powered off state, or (b) sensing a power supply voltage (that is for driving the display screen) dropping towards zero volts. In response, the control circuit 27 may then cause the switch circuits 26 to transition into a low impedance state or conducting mode. The control circuit may be powered by a voltage source, through for example the $V_{supply}+$ and $V_{supply}-$ regulated dc voltage rails used for driving the display screen, which it may use in order to drive the switch circuits 401 back into their high impedance or substantially non-conducting mode, when it detects that the display screen is transitioning into a powered on state. The control circuit may be implemented as a transistor-based logic circuit, using for example enhancement mode and/or depletion mode FETs or even TFTs configured as for example switches, inverters, and voltage level shifters, as needed to translate a sensed input signal into the appropriate output signal (which drives the switch circuits).

As indicated above, the control circuit 27 should detect or respond to its input, which can either (a) receive a digital control signal, e.g., from a power manager controller (not shown) or the applications processor (not shown), that indicates that the display screen is or will shortly be in the powered on state, or (b) be connected to a power supply rail for the display screen, whose voltage is moving toward $V_{supply}+$ or $V_{supply}-$. The control circuit should then respond by providing its output signal so as to open the switch circuits 401. The control circuit 461 may be coupled to both voltage supply nodes $V_{supply}-$ and $V_{supply}+$, or just to one, as needed to properly drive the switch circuits 26. For example, if the switch circuits are based on n-channel depletion mode field effect transistors, then the control circuit may only need access to the negative voltage supply node $V_{supply}$- (and power supply ground.) Alternatively, if the switch circuits are based on p-channel depletion mode field effect transistors, then the control circuit may only need access to the positive voltage supply node $V_{supply}$+ (and power supply ground.)

In one embodiment, the switch circuits 26 are formed on a semiconductor substrate that is separate from the substrate on which the display area 2 is formed (e.g., a transparent substrate such as a glass panel.) In such a case, the switch circuits, and perhaps the control circuit 27, may be formed in the substrate of a display driver integrated circuit, along with other display driver circuits. In another embodiment, the switch circuits 26 may be formed directly on the same substrate as the pixel array, e.g., "on the glass" using TFTs, as in a gate on array (GOA) display screen device.

The control circuit 27 may signal the switch circuits 26 to close or enter into their conducting mode, from their open or non-conducting mode, when the display screen is to transition into a powered off state. In the powered off state, the data lines 6 should not be actively changing pixel values for purposes of display, and the gate lines 9 should be inactive so that the pixels in the active area are not driven with pixel values to be displayed. While the display screen is powered off, the rest of a system in which the display screen is embedded may still be running in that certain components may still be powered on. For example, the system may be in "sleep" mode, wherein the display screen portion (which may be a touch screen) is nonfunctional, but a power manager may still be running.

When in conducting mode, the switch circuits 26 may essentially directly connect the common electrode lines 15 to the known voltage source node 28. This equalizes the voltage across the common electrode lines. This equalized state is maintained, under control of the control circuit, as long as the display screen is powered down. Next, when the display screen is to transition into a powered up state, where the data lines 6 and gate lines 9 are to be once again active in driving the display screen with a new video image, the control circuit 27 may then switch the switch circuits 26 into a non-conducting state. At this point, the common electrode lines already have their voltages equalized, giving them a known initial value, but they are now released from the voltage source node and so may be driven by the pixel compensation circuit 19 and the touch sensor circuit 17. This may help reduce or eliminate the occurrence of muras, cloudiness, hot spots, flickering, or visual abnormalities caused by unevenly distributed residual voltages that persist, on the common electrode lines, when the screen is transitioned into the powered on state.

Several instances of the touch sensor circuits 17 are depicted in FIG. 1 as being coupled to different common electrode lines 15. The various instances of the touch sensor circuits may perform different touch sensing functions, such as during a blanking time interval of each frame. For example, one of the touch sensor circuits may generate a touch stimulus voltage on the common electrode lines to which it is coupled. That stimulus voltage allows a touch detector circuit (not shown) that is coupled to the data lines 6, to sense a touch event. The location of the touch event can be detected, by sensing which of the data line 6 has picked up the stimulus. In another embodiment, these functions may be reversed; i.e., a touch sensor circuit may perform a touch detection function, while a touch stimulus circuit (not shown) is driving the data lines to provide the stimulus.

The common electrode lines 15 are also coupled to common electrode pixel compensation circuits 19. The common electrode pixel compensation circuit may drive an electrical current on its coupled common electrode line, that helps compensate for kickback effects that appear in the pixel voltages of the pixels that are coupled to that line 15, during the display time interval of each frame, to help ameliorate the occurrence of flicker.

Thus, the common electrode lines 15 may perform multiple functions within the display screen apparatus. While the display screen is in a powered on state, the common electrode lines may be used for touch sensing by the touch sensor circuits 17 during a blanking interval of each frame (during which the data written into the pixel elements are not being changed), and for compensating the pixel voltages during a display interval of each frame. The common electrode lines are "free" to be driven by the pixel compensation and touch sensing circuits. However, when the display screen transitions into a powered off state, the common electrode lines have their voltages equalized to that of the known voltage node 28, via the switch circuits 26 being switched into conducting mode from non-conducting mode (by the control circuit 27.)

Figure 3:
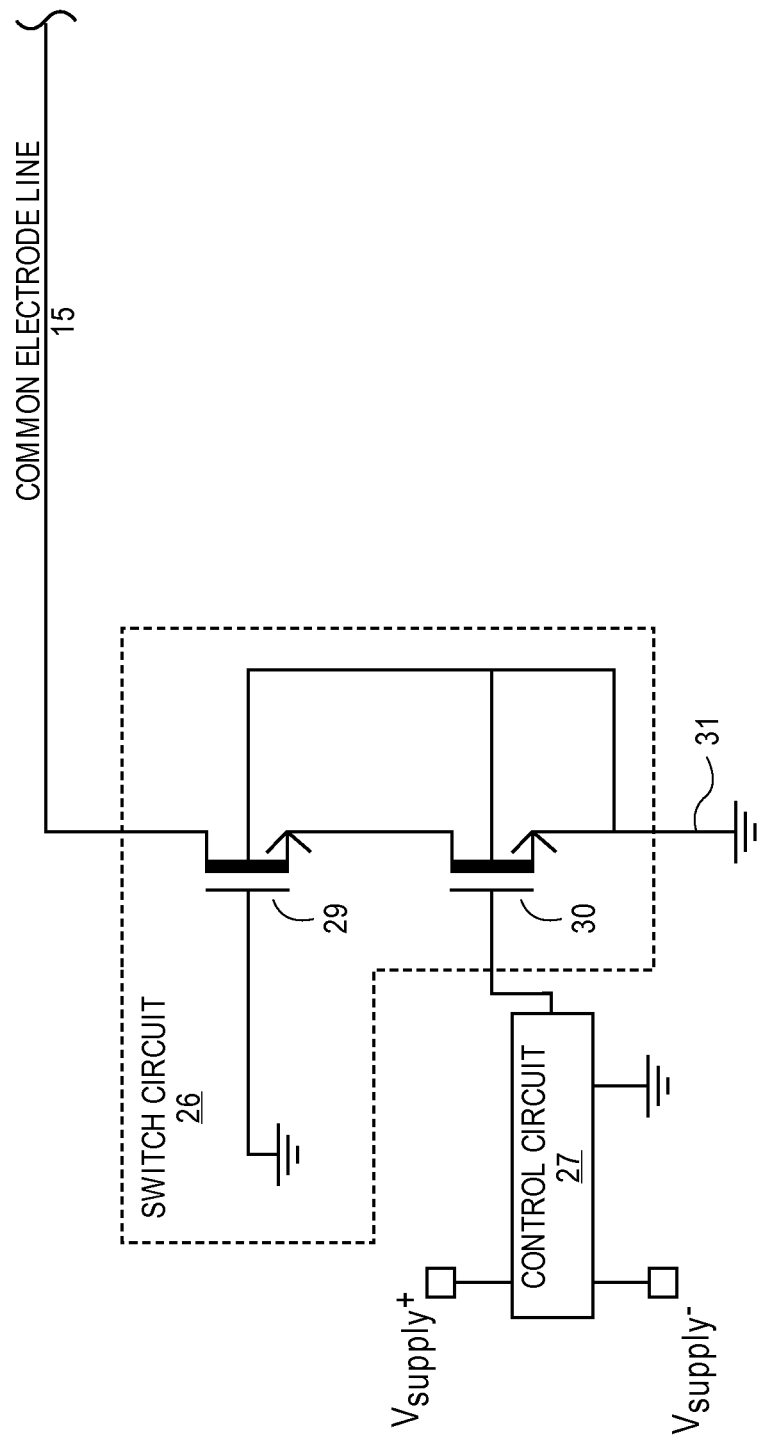
FIG. 3 depicts a particular type of switch circuit, having two transistors arranged in a cascaded stack.

FIG. 3 is a depiction of an example switch circuit 26 containing two transistors arranged in a cascaded stack formation. Both the first and second transistors are depletion mode n-channel FETs that have a control input, a first carrier electrode, a second carrier electrode, and a body electrode. FIG. 3 displays an arrangement where a first transistor 29 is biased on, by having its control input directly connected to ground, meaning that the first transistor is always in conducting mode. The first transistor could also be biased differently, though it should still be conducting at all times. In this embodiment, the first carrier electrode of the first transistor represents the first carrier electrode of the switch circuit 26. This carrier electrode is coupled to the common electrode line 15.

The second carrier electrode of the first transistor 29 is directly connected to the first carrier electrode of a second transistor 30. In this example, the control input of the second transistor 30 is the control input of the control circuit 27. As in FIG. 1, the control circuit is depicted as being coupled to both $V_{supply}$+ and $V_{supply}$- nodes. It may however be coupled to only one of these voltage supply nodes. FIG. 3 also shows that the control circuit may be connected to a voltage source node 31. In this example, the second carrier electrode of the second transistor is coupled to the body electrodes of both the first transistor 29 and the second transistor 30, where these then collectively comprise the second carrier electrode of the entire switch circuit 26. In addition, in this example, the second carrier electrode of the second transistor 30 is also connected to the known voltage source node 31 which here is a ground node. This node 31 as a ground node may be the same as the ground node 28 (see FIG. 1), though alternatively it may be a node of another known voltage source.

The cascaded stack arrangement of FIG. 3 may produce a drop in voltage through the first transistor 29. This additional voltage drop between the common electrode line and the first carrier electrode of the second transistor 30 may be useful when the anticipated residual voltage on the common electrode line 15 is higher than that which the second transistor 30 can reliably or efficiently withstand.

Figure 4:
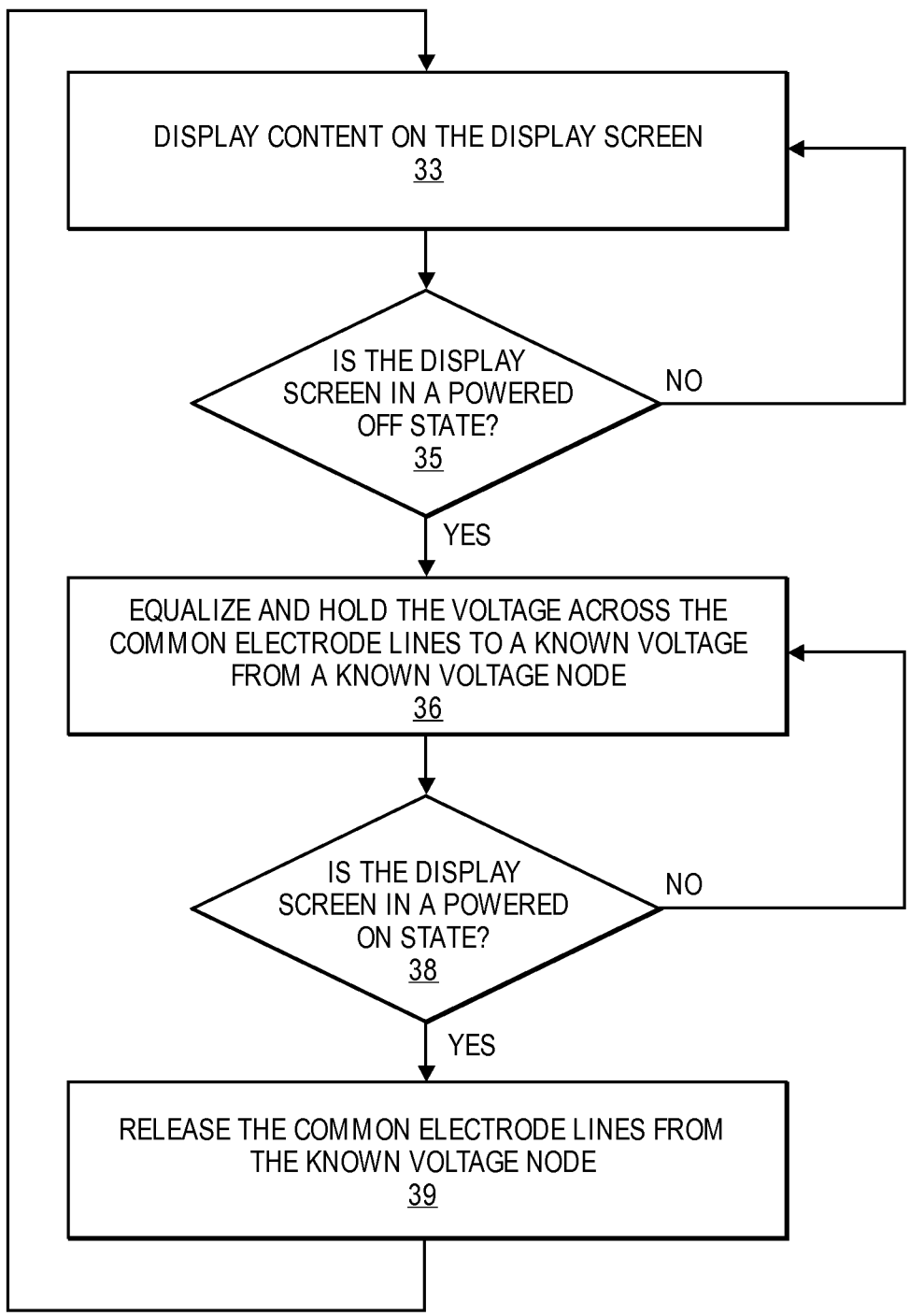
FIG. 4 depicts a flow chart of a process for operating a display screen.

FIG. 4 is a flowchart representing a process in accordance with an embodiment of the invention. The process may begin with block 33 in which image content is driven into the display screen and thus displayed. This may be achieved by driving the data lines 6 and the gate lines 9 of FIG. 1 during a display interval of each consecutive frame, so long as the display screen is not to be powered off.

Next, when the display screen is to transition into a powered off state (block 35), e.g, as detected by the control circuit 27, operation continues with equalizing and holding the voltage across the common electrode lines 15 to a known voltage from a known voltage node (block 36.) This may be by virtue of the switch circuits 26 being placed into their low impedance states, as allowed or signaled by the control circuit 27. This held state of the common electrode lines 15 may continue so long as the display screen is not to be powered on.

When the display screen is to then transition into a powered on state (block 38), again as detected by the control circuit 27, the common electrode lines are released from the known voltage node (block 39.) This may be achieved by the control circuit 27 driving the switch circuits 26 into their non-conducting modes. The process may then repeat with block 33 with subsequent frames being displayed, while the common electrode lines remain in their released state.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art.

What is claimed is:

1. A touchscreen apparatus comprising:
   a display screen having a plurality of pixels, a plurality of gate lines each being coupled to a respective group of the pixels, a plurality of data lines each being coupled to a respective group of the pixels, and a plurality of common electrode lines, each being coupled to a respective group of the pixels;
   a data driver circuit coupled to the plurality of pixels;
   a gate driver circuit coupled to the plurality of pixels;
   a touch sensor circuit coupled to the common electrode lines and the data lines, wherein the touch sensor circuit is to generate a touch stimulus voltage on and sense a touch event voltage on pairs of one of the common electrode lines and one of the data lines, during a blanking interval of a frame;
   a pixel compensation circuit coupled to the common electrode lines, wherein the pixel compensation circuit is to adjust voltage on the common electrode lines during a display interval of the frame to compensate for a pixel voltage shift, and wherein the common electrode lines are affected by both the touch sensor circuit and the pixel compensation circuit during the frame so as to exhibit unevenly distributed residual voltages when the touchscreen apparatus is turned off;
   a plurality of switch circuits, each having a conducting mode and an essentially non-conducting mode, wherein each switch circuit has (a) a control input, (b) a first carrier electrode, and (c) a second carrier electrode, wherein the first carrier electrode is coupled to a respective one of the plurality of common electrode lines, and the second carrier electrode is coupled to a known voltage node, and wherein each switch circuit automatically enters the conducting mode when voltage at its control input goes to zero; and
   a control circuit coupled to the control inputs of the switch circuits, wherein the control circuit only has a power supply input coupled to a power supply voltage and no control inputs, the control circuit to control the switch circuits only in response to its power supply input so as to equalize the voltages of the common electrode lines to a known voltage when the touchscreen apparatus is turned off and the power supply voltage to the control circuit goes to zero, so that the display screen exhibits less visual abnormalities when the touchscreen apparatus is turned on again.

2. The apparatus of claim 1, wherein the control circuit is to signal the switch circuits into conducting mode only in response to its power supply input, and to non-conducting mode only in response to its power supply input.

3. The apparatus of claim 1, wherein each switch circuit comprises a first depletion mode n-channel field effect transistor, being one of a MOSFET and a thin film transistor.

4. The apparatus of claim 3, further comprising a second depletion mode n-channel field effect transistor that is arranged in a cascaded stack with the first transistor, and wherein a control electrode of the second transistor is tied to a voltage source node.

5. A method for operating a touchscreen that has a plurality of common electrode lines and a plurality of data lines, comprising:
   driving the touchscreen with image content while adjusting voltage on the common electrode lines during a display interval of each frame to compensate for a pixel voltage variation;
   stimulating the touchscreen to sense touch events during a blanking interval of each frame, wherein a touch stimulus voltage is generated on and a touch event voltage is sensed on pairs of one of the common electrode lines and one of the data lines, wherein the common electrode lines are used for both (a) stimulating or sensing touch events, and (b) compensating for pixel voltage variations, while the touchscreen is in the powered on state so as to exhibit unevenly distributed residual voltages when the touchscreen is powered off;
   detecting that the touchscreen is to transition into a powered off state by sensing a power supply voltage of the touchscreen dropping toward zero volts and in direct response equalizing the voltages of the common electrode lines to a known voltage and holding the common electrode lines at the known voltage while the touchscreen is in the powered off state by driving to zero volts the gates of a plurality of parallel-connected depletion mode field effect transistors that are connected to the common electrode lines; and
   detecting that the touchscreen is to transition into a powered on state and in response releasing the common electrode lines from the known voltage, wherein releasing the common electrode lines from the known voltage comprises driving each of the plurality of parallel-connected depletion mode field effect transistors into its cut off mode of operation.

6. A display driver integrated circuit for a touchscreen, comprising:
   a plurality of nodes to directly connect with a plurality of common electrode lines and a plurality of data lines, respectively, of a touchscreen;
   a touch sensor circuit coupled to the common electrode lines and the data lines, wherein the touch sensor circuit is to generate a touch stimulus voltage on and sense a touch event voltage on pairs of one of the common electrode lines and one of the data lines, during a blanking interval of a frame;

a pixel compensation circuit coupled to the common electrode lines, wherein the pixel compensation circuit is to adjust voltage on the common electrode lines during a display interval of the frame to compensate for a pixel voltage shift, and wherein the common electrode lines are affected by both the touch sensor circuit and the pixel compensation circuit during the frame so as to exhibit unevenly distributed residual voltages when the touchscreen is turned off;

a plurality of switch circuits, each switch circuit having (a) a control input, (b) a first carrier electrode, and (c) a second carrier electrode, wherein the first carrier electrodes are coupled to the plurality of common electrode lines, respectively, and the second carrier electrodes are coupled to a known voltage source node, wherein each switch circuit automatically enters conducting mode when the voltage at its control input goes to zero; and a control circuit having an input that is tied to a power supply voltage rail that is for driving the touchscreen, and no other inputs, and an output coupled to the control inputs of the switch circuits that goes to zero volts directly in response to the power supply voltage rail going to zero volts when the touchscreen is turned off, so that the touchscreen exhibits less visual abnormalities when the touchscreen is turned on again.

7. The display driver integrated circuit of claim 6, wherein the control circuit is to signal the switch circuits into non-conducting mode directly in response to the power supply voltage rail that is for driving the touchscreen.

8. The display driver integrated circuit of claim 6, wherein each switch circuit comprises a first depletion mode n-channel field effect transistor being one of a MOSFET and a thin film transistor, wherein a second carrier electrode of each first transistor is directly connected to ground.

9. The display driver integrated circuit of claim 8, further comprising a second depletion mode n-channel field effect transistor that is arranged in a cascaded stack with the first transistor, and wherein a control electrode of the second transistor is tied to ground.

10. A touchscreen apparatus comprising:
means for displaying image content, including pixel means, first means for conducting current to set pixel voltages in the pixel means, and second means for conducting current to adjust the voltages of common electrodes in the pixel means;

means for generating a touch stimulus voltage on and for sensing a touch event voltage on pairs of the first and second conducting means, during a blanking interval of a frame;

means for adjusting the voltage on the second conducting means to compensate for pixel voltage shift, during a display interval of the frame, and wherein the second conducting means are affected by both the touch generating and sensing means and the pixel voltage shift compensation means during the frame so as to exhibit unevenly distributed residual voltages when the touchscreen apparatus is turned off means for equalizing the voltages of the second conducting means to a known voltage in response to a control input node going to zero volts; and means for controlling the equalizing means so that the voltages of the second conducting means are maintained at the known voltage while the touchscreen apparatus is powered down wherein the controlling means is to sense a power supply voltage of the displaying means dropping to zero, without any further input control signal, as indicating the displaying means is powered down and in response cause the control input node of the equalizing means to go to zero volts.

* * * * *